(12) United States Patent
LaFortune et al.

(10) Patent No.: US 8,009,283 B2
(45) Date of Patent: Aug. 30, 2011

(54) DICHROIC BEAMSPLITTER FOR HIGH ENERGY LASER DIAGNOSTICS

(75) Inventors: Kai N LaFortune, Livermore, CA (US); Randall Hurd, Tracy, CA (US); Scott N Fochs, Livermore, CA (US); Mark D Rotter, San Ramon, CA (US); Lloyd Hackel, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 250 days.

(21) Appl. No.: 12/471,452

(22) Filed: May 25, 2009

(65) Prior Publication Data

US 2010/0097602 A1  Apr. 22, 2010

Related U.S. Application Data

(60) Provisional application No. 61/128,666, filed on May 23, 2008.

(51) Int. Cl.
*G01B 11/26* (2006.01)
(52) U.S. Cl. .................... 356/152.1; 359/583; 250/216
(58) Field of Classification Search ........ 356/3.01–3.15, 356/4.01–4.1, 5.01–5.15, 6–22, 28, 28.5; 250/561, 574; 359/237
See application file for complete search history.

(56) References Cited

U.S. PATENT DOCUMENTS

| | | | | |
|---|---|---|---|---|
| 4,776,691 A | * | 10/1988 | Johnson et al. | 356/152.1 |
| 4,917,490 A | * | 4/1990 | Schaffer et al. | 356/152.1 |
| 5,009,502 A | * | 4/1991 | Shih et al. | 356/152.1 |
| 5,083,857 A | * | 1/1992 | Hornbeck | 359/291 |
| 5,568,315 A | * | 10/1996 | Shuman | 359/485.03 |
| 5,883,719 A | * | 3/1999 | Coope | 356/614 |
| 7,064,817 B1 | * | 6/2006 | Schmitt et al. | 356/139.03 |
| 2006/0256419 A1 | * | 11/2006 | Graf et al. | 359/237 |

OTHER PUBLICATIONS

Taiga Asano, All Solid State Laser Image Amplifier System with Polymer Dye, Aug. 6, 2002, Seoul Korea, Laser and Electro-Optics, CLEO.Pacific Rim, Pacific Rim Conferences, pp. 387-388, vol. 2.*
Francois Hernault, How We Split the IASI Beamsplitter, Sep. 28, 1999, Proceedings vol. 3786, Optomechanical Engineering and Vibration Control, pp. 300-311.*
Prakash Koonath, Polarization-Insensitive Quantum-Well Semiconductor Optical Aemplifier, Sep. 9, 2002, IEEE Journal of Quantum Electronics, vol. 38, No. 9, pp. 1282-1290.*
Peter L. Wizinowich David Le Mignant, The W.M. Keck Observatory Laser Guide Star Adaptive Optics System: Overview, Feb. 2006, Publications of the Astronomical Society of Pacific , vol. 118, pp. 297-309.*

* cited by examiner

*Primary Examiner* — Isam Alsomiri
*Assistant Examiner* — Luke D Ratcliffe
(74) *Attorney, Agent, or Firm* — John P. Wooldridge

(57) ABSTRACT

Wavefront control techniques are provided for the alignment and performance optimization of optical devices. A Shack-Hartmann wavefront sensor can be used to measure the wavefront distortion and a control system generates feedback error signal to optics inside the device to correct the wavefront. The system can be calibrated with a low-average-power probe laser. An optical element is provided to couple the optical device to a diagnostic/control package in a way that optimizes both the output power of the optical device and the coupling of the probe light into the diagnostics.

21 Claims, 2 Drawing Sheets

DICHROIC BEAMSPLITTER FOR HIGH ENERGY LASER DIAGNOSTICS

This application claims priority to U.S. Provisional Application No. 61/128,666, titled "Dichroic Beamsplitter for High Energy Laser Diagnostics," filed May 23, 2008, incorporated herein by reference.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to laser alignment techniques, and more specifically, it relates to the control of the wavefront of a laser in real time.

2. Description of Related Art

All lasers, including high-power, solid-state lasers, need a means of alignment. For low-power, continuous wave (cw) lasers, this may mean a trivial tilting of mirrors while the laser is in operation. For high-power lasers, especially pulsed, high-power lasers, it is not, in general, practical to align the system, at least initially, with the high-power beam. For this reason and for reasons of wavefront control, it is often desirable to employ an alignment laser of much lower power. It is desirable to inject the alignment laser into the high-power beam path and couple it back out in a manner that both maximizes the fidelity to the true high-power beam path and minimizes the impact on the performance of the high-power laser.

SUMMARY OF THE INVENTION

It is an object of the present invention to provide techniques for active wavefront control of high power lasers.

Another object is to provide intracavity beamsplitters that enable real time wavefront control of high power lasers.

These and other objects will be apparent based on the disclosure herein.

High-power lasers, especially those designed for pulsed-output, on-demand and/or heat-capacity operation as a laser weapon, require a means of controlling the wavefront as the device is operated and thus thermally loaded. Wavefront control is needed to optimize the performance characteristics of the laser such as output power or propagation to a target. Although embodiments of the present invention can use a number of different wavefront sensors and control system hardware, some embodiments use an unstable resonator with a deformable mirror within the resonator cavity. A Shack-Hartmann wavefront sensor measures the wavefront distortion and a control system generates a feedback error signal to optics inside the cavity that corrects the wavefront. The system is calibrated with a low-average-power probe laser. It can be difficult to build such a system that can both accommodate the high power laser and transmit enough of the low power probe laser to be able to calibrate the system with a high signal to noise ratio. The present invention includes an optical element that can be used to couple to the diagnostic/control package in a way that optimizes both the output power of the laser and the coupling of the probe light into the diagnostics.

Embodiments of the invention can be use, e.g., for alignment and calibration of high power lasers and directed energy weapons. Embodiments can be used as a replacement for a conventional beam splitter in an optical system such as an interferometer, a high power laser for materials processing or a similar system that must be sensitive and accurate over a wide dynamic range.

Wavefront quality is a driving metric of the performance of solid-state, heat-capacity lasers (SSHCLs). A deformable mirror with over 100 degrees of freedom situated within the cavity is described for the correction of both the static and dynamic aberrations sensed with a Shack-Hartmann wavefront sensor. The laser geometry is an unstable, confocal resonator with a clear aperture of 10 cm×10 cm. It operates in a pulsed mode at a high repetition rate (up to 200 Hz) with a correction being applied before each pulse. Wavefront information is gathered in real-time from a low-power pick-off of the high-power beam. It is combined with historical trends of aberration growth to calculate a correction that is both feed-back and feed-forward driven. The overall system design, measurement techniques and correction algorithms are discussed.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
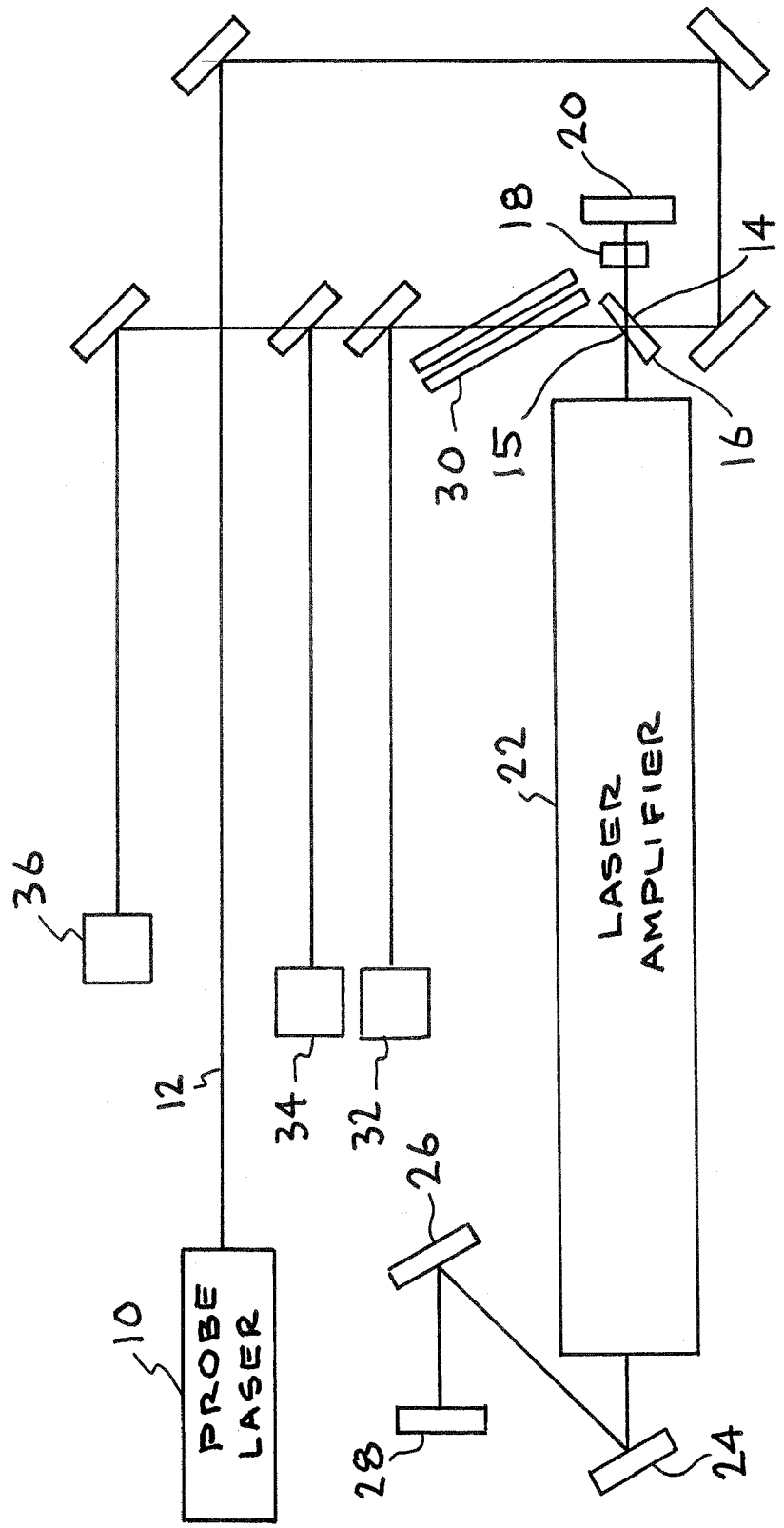
FIG. 1 shows an early embodiment of the present invention.

The present invention includes designs for a beam splitter that can be used for the alignment of a high-power laser; especially one that needs active wavefront control. The beam splitter can comprise an optic that has two flat surfaces that are not parallel by a small wedge angle. Each surface is coated with a different optical coating.

The angle of the wedge should be small enough not to introduce too much astigmatism into the optical path and yet large enough so that reflections from one of the surfaces can be rejected while reflections from the other surface can be collected in the diagnostics. In one embodiment, the wedge angle is about half of a degree.

The beam splitter is designed for two wavelengths. The high-power laser is designed to run at a single wavelength, say $l_0$. The probe laser is chosen to run at a single yet different wavelength, say $l_1$. The two wavelengths are chosen to be similar enough such that $l_0-l_1 \ll l_0$. With this condition satisfied, the propagation of the two wavelengths through most of the other optics in the system will be kept as similar as possible. Dispersion within the optical materials will put an upper limit on how different the wavelengths, and hence how different the optical path lengths, can be while still staying within the allowable tolerances of the system. In an exemplary system, the two wavelengths are 1064 nm (high power laser) and 1090 nm (probe laser).

In some designs, it is desirable for both optical coatings to be polarization insensitive. Being a beam splitter, it is not possible to be completely polarization insensitive, because it is not possible to be normally incident onto the beam splitter. In some embodiments, the incident angle is minimized within the physical constraints of the system, about 22.5 degrees.

One surface of the beamsplitter is meant to be invisible to both wavelengths. It can be coated with an antireflection (AR) coating having zero reflectivity at both wavelengths. For simplicity of design, a broadband AR coating with a minimum reflectivity chosen to be near the high power wavelength was chosen for some embodiments. It is more important that the high power laser have a lower reflectivity for a couple of reasons. First, any losses in the cavity at the lasing wavelength will decrease the laser's efficiency and hence it's output power. Second, spurious (ghost) reflections from that surface could make their way into the diagnostics and confuse if not physically damage diagnostics, preventing further alignment or wavefront control. The minimum reflectivity can be chosen to be near and not at the high power wavelength because there is a design point near the minimum polarization-averaged reflectivity where the difference in reflectivities at the two wavelengths is a minimum. This is where the AR coating is placed in an exemplary design of the present invention. Reflectivities of less than 0.2% have been achieved.

The second surface must have a more tightly toleranced design because it must have adequate reflectivities at the two wavelengths of interest. It must be a dichroic coating. It must have, like the first coating, a minimum reflectivity at the high power laser wavelength. But, it must have a higher reflectivity, e.g., ~50%, at the other wavelength. Working near the reflectivity edge of a highly reflective multilayer dielectric coating can achieve this effect if tight enough tolerances can be achieved. Again, the difficulty here is to achieve similar reflectivites for both polarizations. In a test system, nearly a 15% reflectivity at 1090 nm was achieved while simultaneously achieving less than 1% reflectivity at 1064 nm.

The dichroic coating serves multiple purposes. It provides a significant reflection of the probe wavelength such that the alignment of a high power laser can be done with a relatively low power (<10 W) laser. It provides an absorption-free way of attenuating the amount of the high power beam that is coupled into the diagnostic package, reducing both the need to attenuate further and the risk to the diagnostics themselves. It also minimizes the non-common-path errors introduced into the system because a pickoff element is already placed in the system. It is unnecessary to insert an optical element into the beam path to perform alignment. Since the element remains in the path at all times, it can therefore be utilized for active laser beam wavefront control.

The wavefront quality of a laser is often a driving factor in its design, especially if the output is meant to propagate over large distances, be focused tightly onto a target or both. If care is not taken to control the spatial coherence or phase distribution across the output aperture, lasers can have poorer propagation characteristics than an incoherent source. The maximum performance achievable from a laser is a function of two things: 1) the (static) imperfections in the optical components used to construct it and 2) the (dynamic) aberrations induced during operation such as thermally-induced distortions. Lasers can be built with expensive components with tight tolerances, and they can be designed to minimize the impact of the thermal aberrations. However, in the design of high-energy lasers, it is not always possible to design out all of the static or dynamic aberrations. In such cases, additional measures must be taken. One approach is the use of an adaptive optics control system. Wavefront control of lasers using adaptive optics is nothing new. Typically, though, extracavity correction is employed because implementation is much easier than intracavity correction. However, intracavity correction provides additional benefits such as control over mode growth and output power. Implementing an adaptive optics control system inside a resonator is simple from an optomechanical point of view. But, it is difficult from a control standpoint because there is not a one-to-one correspondence between the phase that can be measured and the phase that needs to be applied as a correction. The relationship between an intracavity corrector and a phase sensor for an unstable resonator can be approximated by a geometrical model. Previous experimental attempts at intracavity correction of a laser's output with adaptive optics resulted in limited success. Embodiments of the present invention have succeeded in providing intracavity correction on flashlamp-pumped and diode-pumped, solid-state, heat-capacity lasers.

FIG. 1 shows an early embodiment of the present invention. A probe laser 10 provides a laser beam 12 that is polarized perpendicular to the plane of the page. This beam is injected into the optical cavity of a high power laser from the first surface 14, in this example, of an intracavity splitter 16 designed and built as discussed above. This first surface has a dichroic coating, which reflects a portion of the incident probe laser beam. The second surface 15 is AR coated and the two surfaces 14 and 15 are not parallel with each other, but are wedged as discussed above. The probe beam reflected from the dichroic beam splitter has retained its original polarization orientation, which is then rotated 45 degrees by a ¼ wave plate 18. The probe beam then reflects from the output coupler 20, and propagates back through the ¼ wave plate, where its polarization is again rotated 45 degrees. The probe beam then propagates through a laser amplifier 22 to a folding mirror 24, to a deformable mirror 26 and to a high reflector 28, which reflects the probe beam back through the laser amplifier to the intracavity splitter, where the dichroic coating reflects it through the polarizing beamsplitters 30 to the far-field sensor 32, the near-field sensor 34 and to the wavefront sensor 36. The dominant polarization of the high power laser beam is parallel to the plane of the page, such that the portion of the beam having that polarization orientation that is reflected from the intracavity beam splitters dichroic coating will not be substantially transmitted through the polarizing beamsplitter. The small amount of the high power laser beam that is transmitted through the polarizing beamsplitter (from any polarization orientation) can be observed with the sensors, which allows the high power laser system to be optimized in real time.

Figure 2:
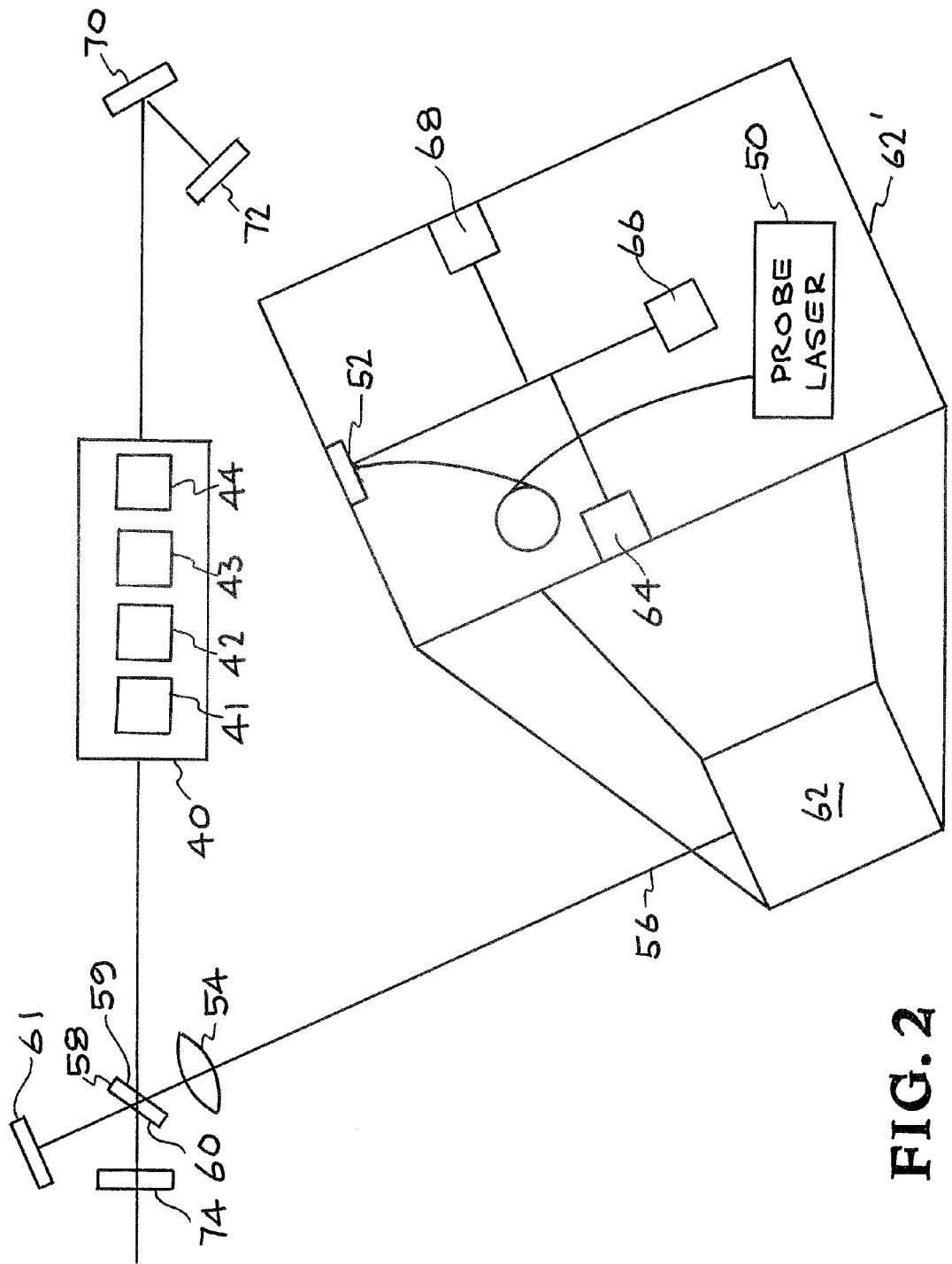
FIG. 2 shows an embodiment of the present intracavity, adaptive resonator that is incorporated into a solid-state, heat-capacity laser.

FIG. 2 shows an embodiment of the present invention, in which an intracavity, adaptive resonator is incorporated into a solid-state, heat-capacity laser (SSHCL). This embodiment has been reduced to practice be the present inventors at Lawrence Livermore National Laboratory. It is a diode-pumped laser with over 10% electrical-to-optical efficiency. This laser is capable of producing over 30 kW of average power at 1064 nm. It is a pulsed laser, generating 500 μsec pulses at up to 200 Hz. It has been designed to run for bursts of up to 2000 shots before having to go through an active or passive cooling cycle. The clear aperture is a square 10 cm on a side. The geometry is a positive-branch, confocal, unstable resonator with a magnification of 1.5. The output profile of this laser is a square annulus with inner dimensions of 6⅔ cm on a side. Shown are the location of the gain media, resonator optics and diagnostic box. The amplifier 40 contains four diode-pumped Nd:YAG slabs 41-44 oriented normal to the optical axis of the cavity. The diodes pump the face of the slabs from a skew angle. The deformable mirror and tip-tilt correction are both at one end of the cavity. The output of the laser at the other end is a square annulus. The diagnostics measure the fully-filled 10 cm×10 cm beam picked off just before the output. The laser's performance is measured in the near-field intensity, the far-field intensity and the gradient of its phase.

Referring still to FIG. 2, a probe laser 50, which is a fiber laser, is set up on the diagnostics area so that its output face 52 is aligned slightly off of the optical axis of a collimating lens 54. The probe beam 56 is collimated by the collimating lens. A portion of the probe beam propagates through an intracavity splitter 58 and reflects from a reference flat 61 back through the intracavity splitter and collimating lens to the diagnostics area 62 (which is magnified as view 62') where it is directed to a near-field sensor 64, a far-field sensor 66 and a wavefront sensor 68. The beam reflected back from the reference flat is focused down by the collimating lens to the input aperture of the diagnostics area and is slightly offset from the output face of the probe laser. The data collected by the near-field sensor, the far-field sensor and the wavefront sensor, from the beam reflected by the reference flat, are used to calibrate a baseline.

As the probe beam initially propagates from through the intracavity splitter, it encounters a first surface 59 and then a second surface 60 of the splitter 58. In this embodiment, the first surface 59 is AR coated as discussed above and is wedged in orientation with respect to the second surface 60, which has a dichroic coating, as discussed above. (In other embodiments, the first surface has a dichroic coating and the second surface is wedged and has an AR coating.) A portion of the probe beam that is reflected from the reference flat is then reflected by the dichroic coating toward the output coupler, which reflected the probe beam so that it propagates through the intracavity splitter to the deformable mirror 70, to a high reflector 72, back to the intracavity splitter. This probe beam portion reflected from the high reflector propagates past the AR coated first surface of the intracavity splitter and is reflected by the dichroic coating on the second surface. This portion of the probe beam is thus directed to propagate back through the collimating lens, which focuses the probe beam to the input aperture of the diagnostics area, where the probe beam is directed to the sensors. This beam can be compared with the beam that was reflected from the reference flat directly back to the sensors whereby the deformable mirror can be calibrated and the high power laser cavity can be aligned. During operation of the high power laser system, the dichroic coating reflects a portion of the high power beam to the sensors, which enables optimization of the high power laser in real time. The high power laser cavity is completed with output coupler 74.

There are some key differences between the specifications of the embodiment described with reference to FIG. 2 compared to that of the a flashlamp-pumped system as described with reference to FIG. 1. The obvious one is the pumping mechanism, which was changed from flashlamps to diodes, bringing along with it an associated 10 fold boost in the overall system efficiency. The host material in the gain medium is different. This results in a slightly different operating wavelength (1064 nm instead of 1053). The slabs of FIG. 2 are oriented normal to the optical axis versus being Brewster's angle. The net result is an unpolarized laser instead of a polarized one. The overall output has increased by more than three times through a combination of an increase in the repetition rate of a factor of 10 and a drop in the pulse energy by a factor of three.

The adaptive-optics control system was adapted to accommodate these differences. Increasing the loop rate of the control system was simply a matter of buying a newer, faster computer than the dual 300 MHz CPU system that controlled the flashlamp-pumped system. A redesign of the electronics hardware provided the opportunity to make several other upgrades such as full frame rate cameras in all diagnostics. The optical system was designed to take into account polarization effects not seen in the previous system. The necessity of a redesign of the optical system provided the opportunity to simplify and make more compact and hence more robust the diagnostics package. All three diagnostics and the reference source were combined into a single leg with a minimum propagation distance. The reference source was upgraded from a small diode-pumped laser to a 4 watt, single-mode fiber laser manufactured by SPI, Inc. A lasing wavelength close to that of the high-power beam of Ytterbium at 1090 nm was used. This wavelength is similar enough to the high-power lasing wavelength that dispersion effects are negligible but different enough that dichroic optics can be used to optimize output coupling of the high-power laser simultaneously to the diagnostic coupling of the probe laser.

The diagnostic sensors, DM hardware and their calibration method were essentially unchanged from the previous system except for some increase in sensitivity. The wavefront was measured and controlled across the whole 10 cm by 10 cm area. The beam-splitter used within the cavity couples out the full beam profile to the diagnostics. Embodiments of the wave front sensor are a Shack-Hartmann wavefront sensor (WFS), which is used to measure the gradient of the phase. The WFS used in some embodiments is a rectangular array of 19×19 lenslets mounted in front of a camera. The average phase within each sampling interval is measured. The sensor was designed for a sensitivity of $<\lambda/50$.

The deformable mirror (DM), located within the resonator cavity, is designed to work with the WFS to compensate for the measured aberrations. One type of usable DM is manufactured by Xinetics Corp., and has a ULE face-sheet, supported by 206 PMN actuators on a pseudo-hexagonal grid with a nominal 1 cm actuator spacing and a dynamic range of 10 μm. There are 126 actuators within the clear aperture of the laser. The surface was polished to a tolerance of $<\lambda/50$; RMS powered figure and coated with a high-damage-threshold, high-reflectivity, multilayer-dielectric coating.

As mentioned above, the WFS is calibrated with the fiber probe laser. First, the probe beam is sent directly to the WFS, bypassing the cavity, to measure a reference point. Then the probe laser is propagated one round trip through the cavity. Each actuator on the DM that is within the clear aperture is pushed, one at a time. The WFS response to each actuator push is recorded as the system impulse response. From the impulse response measurements of all the actuators, a matrix can be built that applies a least-squares fit of the DM surface to any measured wavefront error.

Before operation, most of the static aberrations can be removed by closing the control loop on the probe laser. This gives the laser a good starting point for laser operation. The really good performance is achievable once the WFS measures the active beam. It receives a low-power pick-off of the high power beam. The control system then applies a correction based on the error it sees plus an anticipated shot-to-shot induced error. The combination of the feedback and feedforward signals each contribute to the overall correction.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:
1. A system, comprising:
an optical cavity resonant at a first wavelength;

a probe laser for producing a probe beam at a second wavelength;

a beam splitter (BS) and a deformable mirror located in said cavity, said BS having a first surface with a dichroic coating, said BS having a second surface with an anti-reflection coating;

an optical flat designed to reflect said second wavelength; and a wavefront sensor (WFS);

wherein said probe beam is operatively positioned to be aligned for transmission through said BS and then to be reflected from said flat, wherein a first portion of said probe beam reflected from said flat will propagate through said BS to said WFS, wherein a second portion of said beam will be reflected by said dichroic coating and make one complete oscillation through said cavity and then propagate to said WFS.

2. The system of claim 1, wherein said cavity includes an optical amplifier.

3. The system of claim 1, wherein said first surface is not parallel with said second surface.

4. The system of claim 1, wherein said AR coating comprises a greater percentage of transmission of said first wavelength than said second wavelength.

5. The system of claim 1, wherein said dichroic coating has a greater percentage of reflection at said second wavelength than said first wavelength.

6. The system of claim 1, further comprising a computer readable medium including software designed to read said WFS and change said DM to make corrections in said second portion of said probe beam.

7. The system of claim 1, wherein a portion of said first wavelength will be reflected by said dichroic surface to said WFS.

8. The system of claim 1, wherein said optical flat comprises a multilayer dielectric coating.

9. The system of claim 1, further comprising a computer readable medium including software designed to read the wavefront of said first wavelength at said WFS and change said DM to make corrections in said wavefront.

10. The system of claim 1, wherein said AR coating is polarization insensitive.

11. The system of claim 1, wherein said AR coating comprises a reflectivity at about a point near the minimum polarization-averaged reflectivity where the difference in reflectivities at said first wavelength and said second wavelength is a minimum.

12. The system of claim 1, wherein said dichroic coating is polarization insensitive.

13. A method for aligning an optical cavity resonant at a first wavelength, comprising:

locating a beam splitter (BS) and a deformable mirror in said cavity, said BS having a first surface with a dichroic coating, said BS having a second surface with an anti-reflection coating; and aligning a probe beam for transmission through said BS, wherein said probe beam comprises a second wavelength, wherein after transmission of said probe beam through said BS, said probe beam will then be reflected from an optical flat, wherein a first portion of said probe beam reflected from said flat will propagate through said BS to a wavefront sensor (WFS), wherein a second portion of said probe beam will be reflected by said dichroic coating and make one complete oscillation through said cavity and then propagate to said WFS.

14. The method of claim 13, wherein said first surface is not parallel with said second surface.

15. The method of claim 13, wherein said AR coating comprises a greater percentage of transmission of said first wavelength than said second wavelength.

16. The method of claim 13, further comprising a computer readable medium including software designed to read said WFS and change said DM to make corrections in said second portion of said probe beam.

17. The method of claim 13, wherein a portion of said first wavelength will be reflected by said dichroic surface to said WFS.

18. The method of claim 13, further comprising a computer readable medium including software designed to read the wavefront of said first wavelength at said WFS and change said DM to make corrections in said wavefront.

19. The method of claim 13, wherein said AR coating comprises a reflectivity at about a point near the minimum polarization-averaged reflectivity where the difference in reflectivities at said first wavelength and said second wavelength is a minimum.

20. An alignment system for aligning an optical system, wherein said optical system is capable of being aligned to have an optimum alignment at a first wavelength, wherein said optimum alignment is defined as a best alignment attainable under ambient conditions, wherein said alignment system comprises:

a probe laser for producing a probe beam at a second wavelength;

a beam splitter (BS) and a deformable mirror located in said optical system, said BS having a first surface with a dichroic coating, said BS having a second surface with an antireflection coating;

an optical flat designed to reflect said second wavelength; and a wavefront sensor (WFS);

wherein said probe beam is positionable to be aligned for transmission through said BS and then to be reflected from said flat, wherein a first portion of said probe beam reflected from said flat will propagate through said BS to said WFS, wherein a second portion of said beam will be reflected by said dichroic coating and will then propagate in said optical system and will then propagate to said WFS.

21. A method for aligning an optical system, wherein said optical system is capable of being aligned to have an optimum alignment at a first wavelength, wherein said optimum alignment is defined as a best alignment attainable under ambient conditions, wherein said method comprises:

locating a beam splitter (BS) and a deformable mirror in said optical system, said BS having a first surface with a dichroic coating, said BS having a second surface with an antireflection coating; and aligning a probe beam for transmission through said BS, wherein said probe beam comprises a second wavelength, wherein said probe beam will then be reflected from an optical flat, wherein a first portion of said probe beam reflected from said flat will propagate through said BS to a wavefront sensor (WFS), wherein a second portion of said probe beam will be reflected by said dichroic coating and will propagate in said optical system and will then propagate to said WFS.

* * * * *